United States Patent [19]

Koyama et al.

[11] Patent Number: 4,922,282
[45] Date of Patent: May 1, 1990

[54] OPTICAL APPARATUS FOR LEADING LIGHT FLUXES TRANSMITTED THROUGH LIGHT DIVIDING SURFACE WHICH IS OBLIQUELY PROVIDED TO FOCUS DETECTING APPARATUS

[75] Inventors: Takeshi Koyama, Tokyo; Keiji Ohtaka, Yokohama, both of Japan

[73] Assignee: Canon Kabushiki Kaisha, Tokyo, Japan

[21] Appl. No.: 375,992

[22] Filed: Jul. 6, 1989

[30] Foreign Application Priority Data

Jul. 7, 1988 [JP] Japan ................ 63-169867

[51] Int. Cl.⁵ ............... G03B 3/00; G03B 19/12; G01J 1/20; G02B 5/22
[52] U.S. Cl. .................... 354/406; 354/152; 250/201.2; 350/1.6
[58] Field of Search ........... 354/402, 152, 403, 476, 354/406, 407, 408; 250/201 R, 201 AF, 201 PF, 204

[56] References Cited

U.S. PATENT DOCUMENTS

| | | | |
|---|---|---|---|
| 4,561,748 | 12/1985 | Omaki et al. | 354/403 |
| 4,634,255 | 1/1987 | Suda et al. | 354/406 |
| 4,743,932 | 5/1988 | Matsui | 354/407 X |
| 4,771,307 | 9/1988 | Kuno et al. | 350/1.6 X |
| 4,778,263 | 10/1988 | Foltyn | 350/164 X |
| 4,818,865 | 4/1989 | Matsui et al. | 354/403 X |

*Primary Examiner*—W. B. Perkey
*Attorney, Agent, or Firm*—Fitzpatrick, Cella, Harper & Scinto

[57] ABSTRACT

An optical system for detecting the focus of an objective lens includes a focus detecting apparatus for receiving light intensity distributions reflected from an object and formed by light flux passing through two different areas of a pupil of the objective lens, and for forming a signal indicative of the focus state of the objective lens. A light dividing device is obliquely arranged with respect to the pupil areas of the objective lens and distributes the light fluxes which pass through the objective lens to both the focus detecting apparatus and an optical apparatus. The light dividing device has a dielectric multilayer film such that spectral characteristics of a wave length area in which the focus detecting apparatus has a sensitivity are substantially flat.

8 Claims, 3 Drawing Sheets

OPTICAL APPARATUS FOR LEADING LIGHT FLUXES TRANSMITTED THROUGH LIGHT DIVIDING SURFACE WHICH IS OBLIQUELY PROVIDED TO FOCUS DETECTING APPARATUS

BACKGROUND OF THE INVENTION

1. Field of the Invention

The present invention relates to an optical apparatus having a focus detecting apparatus of a photographing camera, video camera, or the like and, more particularly, the invention is suitable for use in a single-lens reflex camera having a focus detecting apparatus in which a pupil of an objective lens is divided into a plurality of, for instance, two areas. Light intensity distributions regarding two object images are formed by using light fluxes passing through the two areas, a relative positional relation between the two light intensity distributions is obtained, and an in-focus state of the objective lens is thereby detected.

2. Related Background Art

Hitherto, what is called an image deviation system has been known as a focus detection system of the photo sensitive type using light fluxes which passed through an objective lens.

For instance, as already proposed by many Japanese Patent Applications such as JP-A-59-107311, JP-A-59-107313, etc., the image deviation system is constructed in a manner such that a field lens is arranged near a prospective focusing plane on which an object image is formed by an objective lens, a secondary optical system having a porous mask and one or two pairs of secondary lenses is arranged after the field lens, and photo sensitive means having a plurality of photosensitive element arrays is further arranged after the secondary optical system.

Light intensity distributions regarding two object images are respectively formed on the photo sensitive element array surfaces by using the light fluxes which had passed through two different areas of the pupils of the objective lens and came from the secondary optical system. The relative positional relation of the two light intensity distributions which are formed on the photo sensitive element array surfaces at (that time that is, the deviation amounts of the light intensity distributions) differ in dependence on the in-focus state of the objective lens. For instance, such deviation amounts appear as a lateral deviation amount of a secondary object image according to an out-of-focus amount of the object image from the prospective focusing plane of the objective lens in the arranging direction of the elements on the photo sensitive element array.

The out-of-focus state of the objective lens, that is, the focus deviation amount, is obtained by detecting the relative positional relation of the two light intensity distributions at that time, namely, the amount of lateral deviation of the light intensity distributions on the photo sensitive means.

Generally, there is a predetermined functional relation between the relative lateral deviation amount of the two light intensity distributions on the photo sensitive element array and the out-of-focus amount of the objective lens.

In most of the single-lens reflex cameras having the focus detecting apparatus of the image deviation system, a focus detecting apparatus is arranged in the bottom portion of the camera or on the roof type penta prism side. The light fluxes which passed through the objective lens are transmitted through or reflected by a half transparent mirror surface provided in a part of a quick return mirror and, thereafter, they are led to the focus detecting apparatus.

In this case, if the surface of the half mirror is slanted to the dividing direction of the pupils of the objective lens, the focus detecting light fluxes which are led to the focus detecting apparatus asymmetrically enter the half mirror surface, so that the incident angle of the light flux from each pupil of the objective lens to the half mirror surface largely differs depending on the pupil positions.

One of the problems due to such an optical arrangement has already been pointed out in U.S. patent application Ser. No. 115,905 and solved. On the other hand, if a metal mirror is used as a half mirror, an amount of light which is absorbed is large. Therefore, in many cases, a practical dielectric multilayer film is formed on a glass flat plate.

However, when the dielectric multilayer film is used as a half mirror surface, the spectral characteristics such as reflectivity, transmittance, and the like largely differ depending on the difference of incident angles.

Such a phenomenon has been known in, for instance, JP-A-57-179807 with respect to a dichroic mirror of a color television camera.

As a result of the positional differences of the spectral characteristics, an error occurs between a pair of light intensity distributions with respect to objects which are formed on two photo sensitive element array surfaces, causing the focus detecting accuracy to deteriorate.

SUMMARY OF THE INVENTION

It is a main object of the present invention to provide an apparatus for detecting a focus adjusting state of an objective lens in which even when light dividing surfaces are obliquely arranged on a detection light path, the focus adjusting state can be accurately detected.

The seconnd object of the invention is to provide a single-lens reflex camera having a focus detecting apparatus in which a pupil of an objective lens is divided into a plurality of a pupil areas, the light flux which passed through each of the divided pupil areas is asymmetrically input to the half mirror surface provided on the quick return mirror surface, and the light fluxes are led to the focus detecting apparatus through the half mirror surface, and even in such a construction, the light intensity distributions regarding an object image can be accurately formed on the photo sensitive element array surface, and the focus detecting accuracy is high.

DETAILED DESCRIPTION OF THE PREFERRED EMBODIMENT

Figure 1:
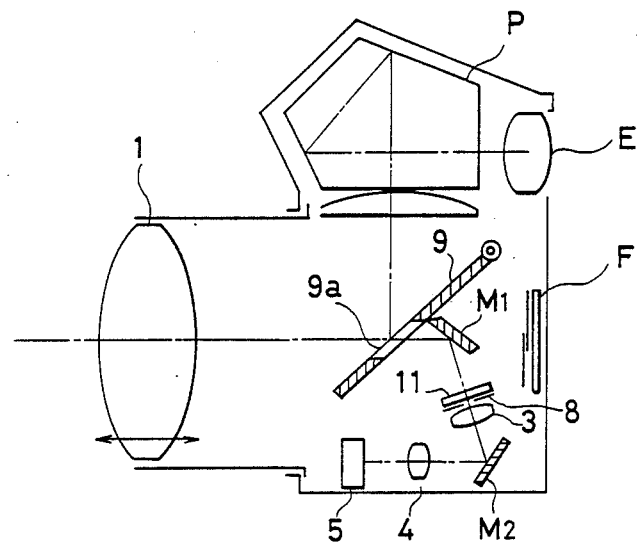
FIG. 1 is a schematic diagram of a main section of an embodiment of the present invention.
Figure 2:
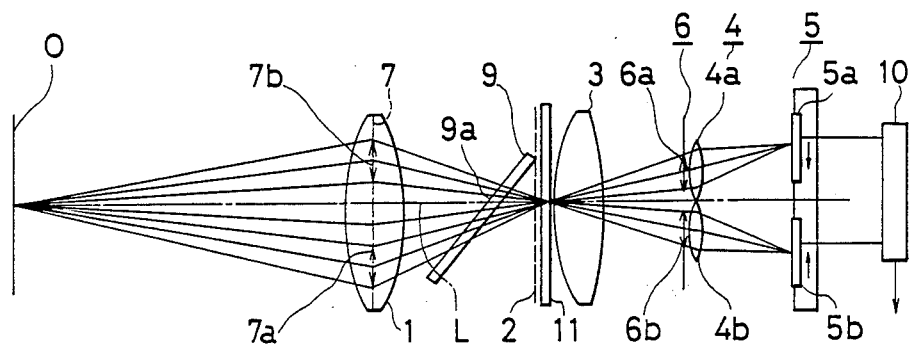
FIG. 2 is an explanatory diagram in which a focus detecting system in FIG. 1 was extracted and developed.

FIG. 1 shows an optical arrangement of the first embodiment of the present invention. FIG. 2 is a diagram of the focus detecting system from FIG. 1.

In FIGS. 1 and 2, reference numeral 1 denotes an objective lens which is fixed or detachably attached to the camera body. Reference numeral 9 denotes a quick return mirror. The upper or back surface of the central portion includes a half mirror surface 9a having spectral characteristics, which will be explained hereinafter, and comprises a multilayer film to which a dielectric material is evaporation deposited. The portion around the half mirror portion is constructed as an ordinary mirror. The whole surface of the quick return mirror 9 may be also constructed as a fixed half mirror. $M_1$ denotes a submirror. In FIG. 2, reference numeral 2 denotes a presumed image forming surface of the objective lens 1, and 11 indicates an infrared cut filter arranged near the prospective focusing plane 2. Reference numeral 3 denotes a field lens arranged near the surfaces 2, and 4 indicates a secondary optical system having an image reforming operation and comprising two positive lenses 4a and 4b which are symmetrically arranged with respect to an optical axis of the objective lens 1. Reference numeral 5 denotes a photo sensitive device comprising two photo sensitive element arrays 5a and 5b arranged behind the two lenses 4a and 4b in correspondence thereto. The secondary optical system makes the photo sensitive surface of the photo sensitive device conjugately relate to the prospective focusing plane. Reference numeral 6 indicates a diaphragm having two aperture portions 6a and 6b arranged in correspondence to the two lenses 4a and 4b. Reference numeral 7 denotes an exit pupil of the objective lens 1. The exit pupil 7 has two divided areas 7a and 7b. Reference numeral 10 denotes arithmetic operating means for obtaining the relative positional relation of both of the light intensity distributions from the signals indicative of the light intensity distributions with respect to the object images which are output from the two photo electric element arrays 5a and 5b, that is, for obtaining the deviation amount to thereby calculate the out-of-focus amount of the objective lens, and for outputting a signal indicative of the result of the calculation. A focusing mechanism (not shown) to focus the objective lens is driven on the basis of the signal indicative of the result of the calculation.

The field lens 3, lenses 4a and 4b, aperture portions 6a and 6b, and the like are a part of the optical assembly. The field lens 3 has the function of imaging the aperture portions 6a and 6b at positions near the areas 7a and 7b of the exit pupil 7 of the objective lens 1. The light fluxes transmitted through the areas 7a and 7b form the light intensity distributions regarding the object images onto the photo sensitive element arrays 5a and 5b. Reference numeral 8 denotes a visual field mask. P indicates a pentagonal roof prism, E indicates an eyepiece which constructs a view finder and into which the light reflected by the quick return mirror 9 was reflected, and F represents a photo sensitive material which is equivalent to the prospective focusing plane of the objective lens 1 and may be film or a solid state image pickup device.

The half mirror surface 9a is obliquely arranged with respect to the areas 7a and 7b of the pupil of the objective lens 1.

In the embodiment, when the image forming point of the objective lens 1 is located in front of the prospective focusing plane 2, the light intensity distributions regarding the object images which are formed on the two photo sensitive element arrays 5a and 5b are close together. When the image forming point of the objective lens 1 is located behind the prospective focusing plane 2, the light intensity distribution regarding the object images which are formed on the two photo sensitive element arrays 5a and 5b are away from each other.

At this time, the deviation amount between the light intensity distributions formed on the two photo sensitive element arrays 5a and 5b and the out-of-focus amount of the objective lens 1 have a predetermiend functional relation.

In the embodiment, a proper function is defined by an arithmetic operating section provided in the arithmetic operating means 10 and the arithmetic operation is executed, thereby obtaining the out-of-focus amount and out-of-focus direction of the objective lens 1.

Figure 3:
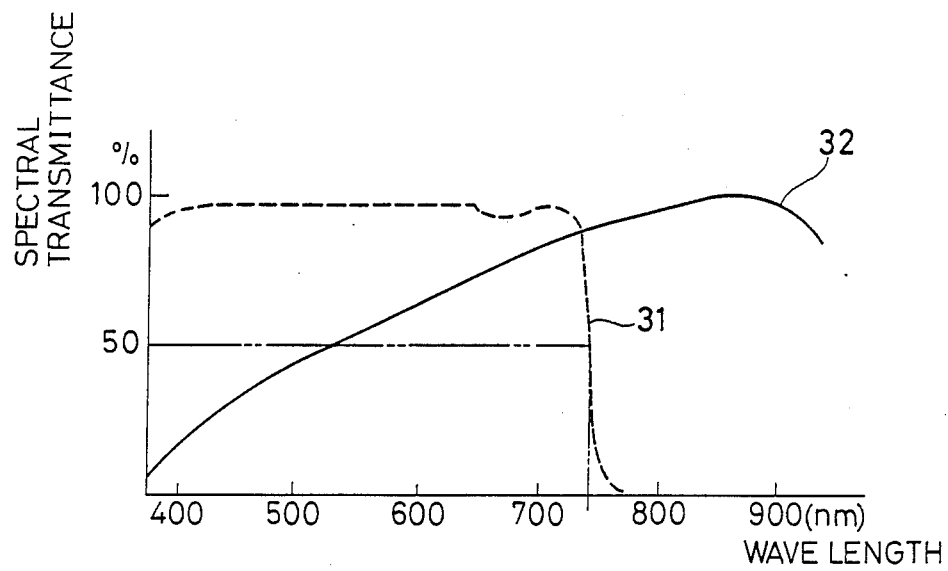
FIG. 3 is an explanatory diagram of spectral characteristics of an infrared cut filter and photo sensitive elements shown in FIG. 1.

In the embodiment, the infrared cut filter 11 is designed so as to have the spectral characteristics in which the transmittance is about 50% at a wavelength near 740 nm as shown by, for instance, a curve 31 in FIG. 3.

The ordinary photo sensitive element arrays 5a and 5b have a peak sensitivity in the infrared area of wavelengths on the order of 800 nm as shown by a curve 32 in FIG. 3. Therefore, the spectral sensitivity of the focus detecting system in the embodiment extends until the wavelengths of about 740 nm in the infrared area. The spectral transmittance characteristic of the half mirror surface 9a of the quick return mirror 9 has a distribution shown in, for instance, FIG. 4.

Figure 4:
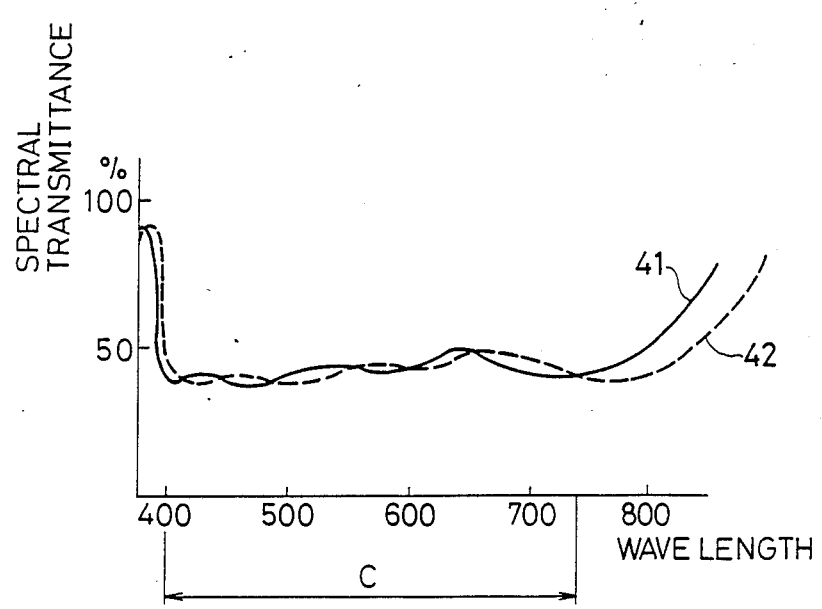
FIG. 4 is a explanatory diagram of spectral characteristics of a half mirror surface according to the invention.

In FIG. 4, curves 41 and 42 denote spectral characteristics of the central light fluxes which enter the photo sensitive element arrays 5a and 5b. In the embodiment, as shown in the diagram, the dielectric multilayer film is constructed so as to obtain the substantially flat characteristics as shown by the curves 41 and 42 within a range of the incident angle of the light flux to the half mirror surface 9a which enters the optical assembly to detect the focus in a spectral sensitivity area C of the focus detecting system.

Figure 5:
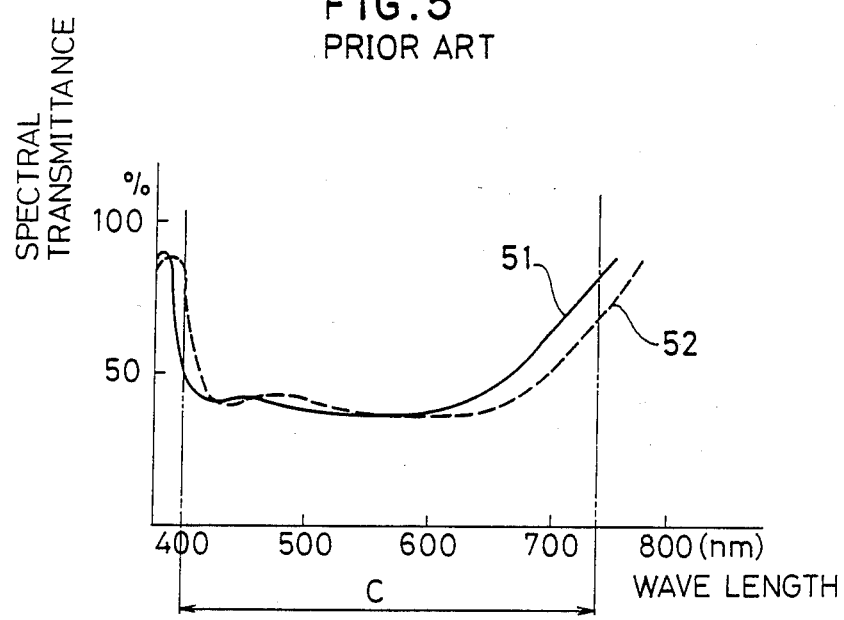
FIG. 5 is an explanatory diagram of spectral characteristics of a conventional half mirror surface.

In the conventional apparatus in the state of FIG. 2, when it is assumed that the light flux from the objective lens 1 enters the half mirror surface 9a of the quick return mirror 9 and an ordinary film is used as a dielectric multilayer film of the half mirror surface 9a, spectral characteristics as shown in FIG. 5 are obtained. In the diagram, curves 51 and 52 denote spectral characteristics of the central light fluxes which enter the photo sensitive element arrays 5a and 5b. The area C shows the spectral sensitivity area which the above focus detecting system has.

Figure 6:
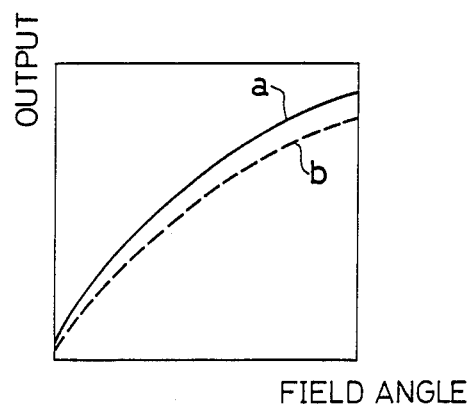
FIG. 6 is an explanatory diagram of output signals from a pair of photo sensitive element arrays when the lights beams are received through the half mirror surface shown in FIG. 5.

When incident angles of the light fluxes to the half mirror surface 9a differ, the spectral characteristics are shifted in the lateral direction. When the light intensities are integrated at an arbitrary position in the area C, the shift amount results in the difference between the light intensities. Therefore, for instance, in the case of an object which gradually becomes dim in one direction, the output signals from the photo sensitive element arrays 5a and 5b become as shown in FIG. 6 and an output difference in the vertical direction occurs. Such a vertical deviation is detected as an image deviation in the lateral direction and eventually becomes a cause of an erroneous distance measurement.

The cause of the erroneous distance measurement in this case largely depends on the characteristics in the near infrared area. Therefore, even if the outputs were standardized by photographing, for instance, a white plain object, in other words, in the whole wavelength area having the sensitivity, even if the output signals from the two photo sensitive element arrays were electrically corrected so as to be equalized, the output difference also likewise occurs at a certain position in the wavelength area C of the spectral characteristics of the focus detecting system.

If the difference between the incident angles to the half mirror surface is small, the lateral deviation of the spectral characteristics decreases and the output difference is also reduced. However, the small difference of the incident angles denotes that the length of the base line of the focus detecting system is short. It is difficult to obtain a high focus detecting accuracy. Therefore, such a method of reducing the difference of the incident angles is not proper as a solving method.

In the embodiment, the dielectric multilayer film of the half mirror surface 9a is constructed so as to have the spectral characteristics shown in FIG. 4, thereby suppressing the difference between the output signals from the photo sensitive element arrays 5a and 5b based on the difference between the incident angles of the light fluxes to the half mirror surface 9a. A technique to obtain such a degree of spectral characteristics can be easily accomplished by the present ordinary multilayer film designing technique.

In the spectral characteristics shown in FIG. 4, it is assumed that the incident angles to the half mirror surface are set to about 45±6°. However, if the difference between the incident angles is small, the difference between the curves 41 and 42 is further reduced.

As will be also obvious from FIG. 3, the sensitivity of the focus detecting system is largely one-sided in the infrared area and the output signal difference is also remarkable in the near infrared area.

On the other hand, the number of layers must be increased to widen the flat region of the spectral characteristic area in the dielectric multilayer film. However, if the number of layers is excessively increased, a ripple easily occurs in the spectral characteristic curve. Therefore, too many layers are improper.

To prevent such a problem, according to the embodiment, at wavelengths at which the transmittance characteristic of the light flux (the lower light flux in FIG. 2) whose incident angle to the half mirror surface increases is set to 50±5% of the spectral transmittance characteristic of the infrared cut filter 11, the spectral sensitivity of the focus detecting system is selected to a value which is 1.2 times or less than the average transmittance of the half mirror surface in a predetermined range.

When the difference of the incident angles to the half mirror surface 9a is ±2° or more with respect to 45°, the above processes are executed.

In the embodiment shown in FIG. 1, the focus detecting apparatus can be also arranged above the quick return mirror 9 and the focus detection can be also executed by using the light fluxes reflected by the half mirror surface 9a.

In the embodiment, a set of the optical assembly for the focus detection and the photo sensitive device has been illustrated. However, a plurality of sets can be also arranged. Various kinds of well-known forms can be used as an optical assembly.

According to the invention, it is possible to realize an optical apparatus having a focus detecting apparatus in which when the light fluxes which passed through a plurality of divided pupil areas of the objective lens are led to the focus detecting apparatus through the half mirror surface which is inclined in a predetermined direction, by setting the spectral characteristics of the dielectric multilayer film which is formed on the half mirror surface as mentioned above, it is possible to form good light intensity distributions regarding the object images such that the output levels can be equalized on the pair of photo sentsitive element arrays and the focus detection can be executed at a high precision.

What is claimed is:

1. An optical system to detect a focus adjusting state of an objective lens, comprising:
   a focus detecting apparatus for receiving light intensity distributions regarding an object which are respectively formed by light fluxes which passed through different areas on a pupil of said objective lens, and for forming a signal indicative of the focus adjusting state of the objective lens with respect to the relative positional relation of said light intensity distributions;
   an optical apparatus; and
   a light dividing device, obliquely arranged with respect to said pupil areas, for distributing the light fluxes which passed through the objective lens to both of the focus detecting apparatus and the optical apparatus, said light dividing device having a dielectric multilayer film such that spectral characteristics of a wavelength area in which the focus detecting apparatus has a sensitivity are substantially flat.

2. A system according to claim 1, wheren said focus detecting apparatus comprises:
   a field lens arranged near a prospective focusing plane of said objective lens;
   a photo sensitive device having a plurality of photo sensors; and
   imaging elements for forming said light intensity distributions onto said photo sensitive device from the light fluxes which passed through said field lens.

3. A system according to claim 2, wherein said imaging elements comprise a mask having apertures and positive lenses.

4. A system according to claim 1, wherein said optical apparatus is a view finder.

5. A system according to claim 1, wherein said optical apparatus has a body of a single-lens reflex camera, and said light dividing device is a part of a quick return mirror.

6. A camera in which an object image formed by an objective lens is received by a photo sensitive material, comprising:
   a focus detecting apparatus for receiving light intensity distributions regarding an object which are respectively formed by light fluxes which passed through different areas on a pupil of the objective lens, and for forming a signal indicative of a focus adjusting state of the objective lens with respect to a relative positional relation of said light intensity distributions;
   observing means for observing the object through the objective lens; and a light dividing device, obliquely arranged with respect to said pupil areas, for distributing the light fluxes which passed through the objective lens to both of the focus detecting apparatus and the optical apparatus, said light dividing device having a dielectric multilayer film such that spectral characteristics of a wavelength area in which the focus detecting apparatus has a sensitivity are substantially flat.

7. A camera according to claim 6, wherein said focus detecting apparatus comprises:

a field lens arranged near a prospective focusing plane of said objective lens;

a photo sensitive device having a plurality of photo sensors; and imaging elements to form said light intensity distributions onto the photo sensitive device from the light fluxes which passed through said field lens.

8. A camera according to claim 7, wherein said imaging element comprise a mask having apertures and positive lenses.

* * * * *